(12) United States Patent
Murai et al.

(10) Patent No.: US 7,425,163 B2
(45) Date of Patent: Sep. 16, 2008

(54) OUTBOARD MOTOR

(75) Inventors: Naoya Murai, Shizuoka-ken (JP);
Sakayuki Kimura, Shizuoka-ken (JP);
Hideaki Matsushita, Shizuoka-ken (JP)

(73) Assignee: Yamaha Marine Kabushiki Kaisha, Shizuoka-Ken (JP)

( * ) Notice: Subject to any disclaimer, the term of this patent is extended or adjusted under 35 U.S.C. 154(b) by 0 days.

(21) Appl. No.: 11/517,738

(22) Filed: Sep. 8, 2006

(65) Prior Publication Data

US 2007/0054569 A1 Mar. 8, 2007

(30) Foreign Application Priority Data

Sep. 8, 2005 (JP) ............................. 2005-261129

(51) Int. Cl.
*B63H 20/32* (2006.01)

(52) U.S. Cl. ...................................... 440/77; 440/88 A

(58) Field of Classification Search ................... 440/76, 440/77, 78, 88 A, 88 R; 123/195 C, 195 P, 123/516

See application file for complete search history.

(56) References Cited

U.S. PATENT DOCUMENTS

| 4,978,321 A | 12/1990 | Ferguson |
| 5,992,368 A | 11/1999 | Okamoto |
| 6,099,372 A * | 8/2000 | Toyama ........................ 440/77 |
| 6,149,477 A * | 11/2000 | Toyama ..................... 440/88 R |
| 6,358,105 B1 * | 3/2002 | Isogawa et al. ................ 440/77 |
| 6,485,342 B2 * | 11/2002 | Tsubouchi et al. ......... 440/88 A |
| 6,488,552 B2 | 12/2002 | Kitsu et al. |
| 6,719,597 B2 | 4/2004 | Yoshioka et al. |
| 7,118,432 B2 * | 10/2006 | Katayama ..................... 440/77 |
| 7,238,069 B2 * | 7/2007 | Ito et al. ........................ 440/77 |
| 2004/0149241 A1 | 8/2004 | Shomura et al. |

FOREIGN PATENT DOCUMENTS

| JP | 55-083696 | 6/1980 |
| JP | 61-12898 | 1/1986 |
| JP | 61-4718 | 2/1986 |
| JP | 10-153151 | 6/1998 |
| JP | 2004-239156 | 8/2004 |
| JP | 2004-299485 | 10/2004 |

OTHER PUBLICATIONS

Specification and Drawings of U.S. Appl. No. 11/453,648, filed Jun. 15, 2006, Title: Outboard Motor, Our Reference.
Specification and Drawings of U.S. Appl. No. 11/314,924, filed Dec. 20, 2005, Title: Outboard Motor, Our Reference.

(Continued)

*Primary Examiner*—Lars A Olson
(74) *Attorney, Agent, or Firm*—Knobbe, Martens, Olson & Bear LLP

(57) ABSTRACT

An outboard motor includes a cowling enclosing an engine, an ambient air intake defined by the cowling, and an intake passage introducing ambient air taken through the ambient air intake to the engine. The intake passage extends out of and above a top section of the cowling. An inlet portion of the intake passage communicates with the ambient air intake, and an outlet portion thereof communicates with an air inlet leading to a silencer of the engine the air inlet is positioned vertically higher than the intake passage inlet portion.

19 Claims, 4 Drawing Sheets

OTHER PUBLICATIONS

Specification and Drawings of U.S. Appl. No. 11/435,699, filed May 16, 2006, Title: Outboard Motor With Cowling, Our Reference.

Specification and Drawings of U.S. Appl. No. 11/320,372, filed Dec. 28, 2005, Title: Outboard Motor With Cowling, Our Reference.

* cited by examiner

OUTBOARD MOTOR

CROSS-REFERENCE TO RELATED APPLICATIONS

This application claims priority to Japanese patent application Ser. No. 2005-261129, which was filed on Sep. 8, 2005, the entirety of which is hereby incorporated by reference.

BACKGROUND OF THE INVENTION

1. Field of the Invention

This invention relates to an outboard motor having a cowling enclosing an engine. More specifically, this invention relates to an outboard motor having an intake passage introducing ambient air taken through an ambient air intake defined by the cowling to the engine.

2. Description of the Related Art

Some outboard motors have an ambient air intake defined by a cowling enclosing an engine so that ambient air is taken through the ambient air intake to be used by the engine for combustion. The ambient air flowing to the engine may be accompanied by water that also enters through the ambient air intake. The interior of the cowling thus can have a labyrinth structure to separate water from the air, and to drain the water.

Japanese publication 2004-239156 discloses a water separator structure formed with a molded air duct or the like to protect electrical components, link members and so forth from water that can splash thereon. Because the labyrinthine water separator structure is provided in the interior of the cowling, its mounting structure can be complicated. Also, it is difficult to provide adequate space within the cowling for such a structure.

In certain operating instances, a large wave can overtake the outboard motor and can surmount the cowling thereof. A large volume of water thus can enter through the ambient air intake. For example, sometimes the outboard motor mounted to a watercraft is abruptly decelerated and shifted to the reverse mode to move the watercraft backward. Under this condition, a following wave approaches the outboard motor and a large volume of water also can enter through the ambient air intake. In addition, some fishing methods can be conducted while the watercraft moves backward. If such a fishing method is applied, the outboard motor can sometimes be entirely submerged, and a large volume of water entering through the ambient air intake can reach the engine of the outboard motor.

If the large volume of water enters through the ambient air intake of the cowling of the outboard motor as discussed above, functional problems such as, for example, rust and adhesion may occur because electric components, link members and so forth contact the water.

SUMMARY OF THE INVENTION

Accordingly, there is a need in the art for an outboard motor having a water separator structure adapted to enable separation of a large volume of water from intake air so as to substantially prevent such water from entering an engine compartment with the intake air.

In one embodiment, the present invention provides an outboard motor in which water entering through an ambient air intake hardly, if at all, enters an intake passage because it flows out of the air intake due to its own weight. As such, ambient air separated from the water can be introduced into an engine.

In accordance with one embodiment, the present invention provides an outboard motor comprising a cowling generally enclosing an engine. The engine has an air intake device. The cowling comprises a top wall, opposing side walls, an ambient air intake defined through a wall of the cowling, and an intake passage adapted to communicate ambient air from the ambient air intake to the engine air intake device. The intake passage is disposed above the cowling top wall. An inlet portion of the intake passage communicates with the ambient air intake and an outlet portion of the intake passage communicates with the engine air intake device.

In another embodiment, an air inlet of the engine air intake device communicates with the intake passage outlet portion at a point above the cowling top wall. In yet another embodiment, the engine air intake device comprises a silencer. In still another embodiment, a portion of the silencer extends through the cowling top wall.

In another embodiment, a cross-sectional area of the intake passage at or adjacent the outlet portion is greater than a cross-sectional area of the intake passage at or adjacent the inlet portion. In a further embodiment, a breadth of the intake passage at or adjacent the outlet portion is greater than a breadth of the intake passage at or adjacent the inlet portion. In a yet further embodiment, a vertical width of the intake passage at or adjacent the outlet portion is greater than a vertical width of the intake passage at or adjacent the inlet portion.

In accordance with yet another embodiment, the intake passage has a bottom surface, and the bottom surface generally slopes downwardly from the inlet portion toward the outlet portion.

In a still further embodiment of the present invention, the intake passage is positioned above the ambient air intake. In other embodiments, the outlet portion of the intake passage is disposed vertically higher than the inlet portion. In yet further embodiments, the intake passage comprises a drain port, and the drain port is positioned on a side of the outlet portion generally opposite the inlet portion. The intake passage can comprise a bottom surface that slopes generally downwardly from the inlet portion toward the drain port. The intake port can comprise a cover member attached to the cowling, and the drain port can be formed between the cover member and the cowling. The top wall of the cowling can comprise the bottom surface of the intake passage.

In yet a further embodiment, the ambient air intake comprises apertures through opposing side walls of the cowling. The ambient air intake apertures can be substantially aligned with one another transversely across the cowling.

In accordance with another embodiment, the intake passage comprises a cover member formed separately from the cowling and attached to an outer surface of the cowling.

In an embodiment in which the intake passage extends out of the cowling and above the top of the cowling, the intake passage is positioned sufficiently higher than the ambient air intake so that even though water enters through the ambient air intake, the water hardly, if at all, enters the intake passage because of its own weight, and the ambient air separated from the water can be introduced into the engine.

In an embodiment in which the outlet portion of the intake passage is positioned above the inlet portion thereof, even if water enters the intake passage through the ambient air intake, the water can be separated from the air by its own weight, and the ambient air can be introduced into the engine from the side of the outlet portion.

BRIEF DESCRIPTION OF THE DRAWINGS

The abovementioned and other features of the inventions disclosed herein are described below with reference to the drawings of the preferred embodiments. The illustrated embodiments are intended to illustrate, but not to limit the inventions. The drawings contain the following figures.

DETAILED DESCRIPTION OF PREFERRED EMBODIMENTS

With first reference to FIGS. 1-3, an embodiment of the outboard motor according to this invention will be described in detail below. The embodiment does not limit the scope of this invention.

Figure 1:
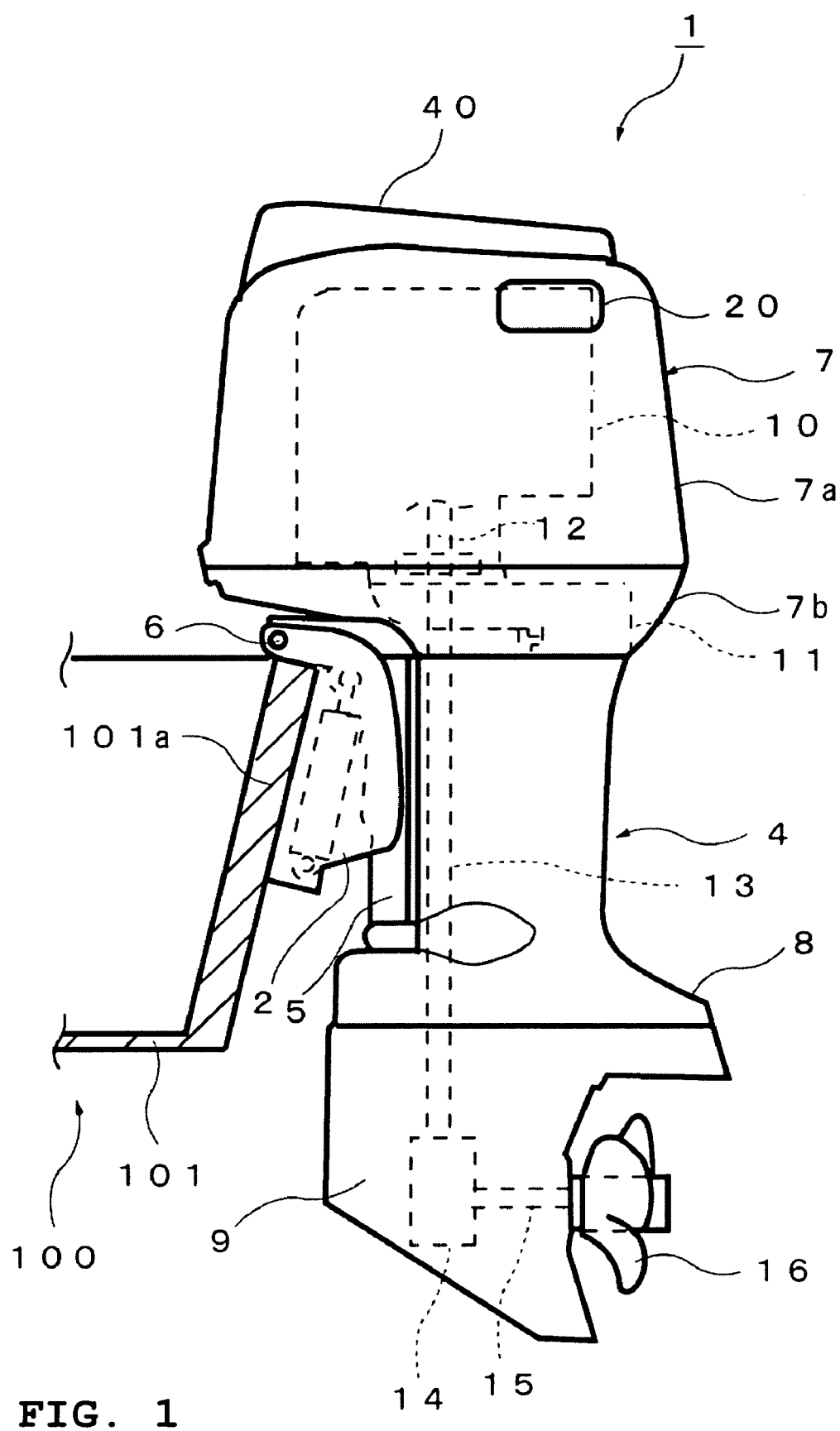
FIG. 1 is a side elevational view of an outboard motor mounted to a watercraft.

FIG. 1 is a side elevational view of an outboard motor mounted to a watercraft. The outboard motor 1 in the illustrated embodiment is attached to a transom board 101a of the hull 101 of the watercraft 100 by a clamping bracket 2. A swivel bracket 5 is fixed to the clamping bracket 2 by a tilt shaft 6 for vertically pivotal movement about an axis of the tilt shaft 6. The swivel bracket 5 elastically supports a propulsion unit 4 of the outboard motor 1.

The propulsion unit 4 has a housing formed with a cowling 7, an upper casing 8 and a lower casing 9. The cowling 7 includes a top cowling member 7a and a bottom cowling member 7b. The cowling 7 encloses a four stroke engine 10. The upper casing 8 is attached to a bottom of an exhaust guide 11. The engine 10 is mounted on the exhaust guide 11.

The engine 10 has a crankshaft 12 extending vertically. A top end of a driveshaft 13 extending vertically through the upper casing 8 is coupled with the crankshaft 12. A bottom end of the driveshaft 13 is coupled with a forward and reverse mode changing mechanism 14. A propeller shaft 15 extends horizontally from the forward and reverse mode changing mechanism 14. A propeller 16 is attached to a rear end of the propeller shaft 15, which projects rearward from the lower casing 9.

Figure 2:
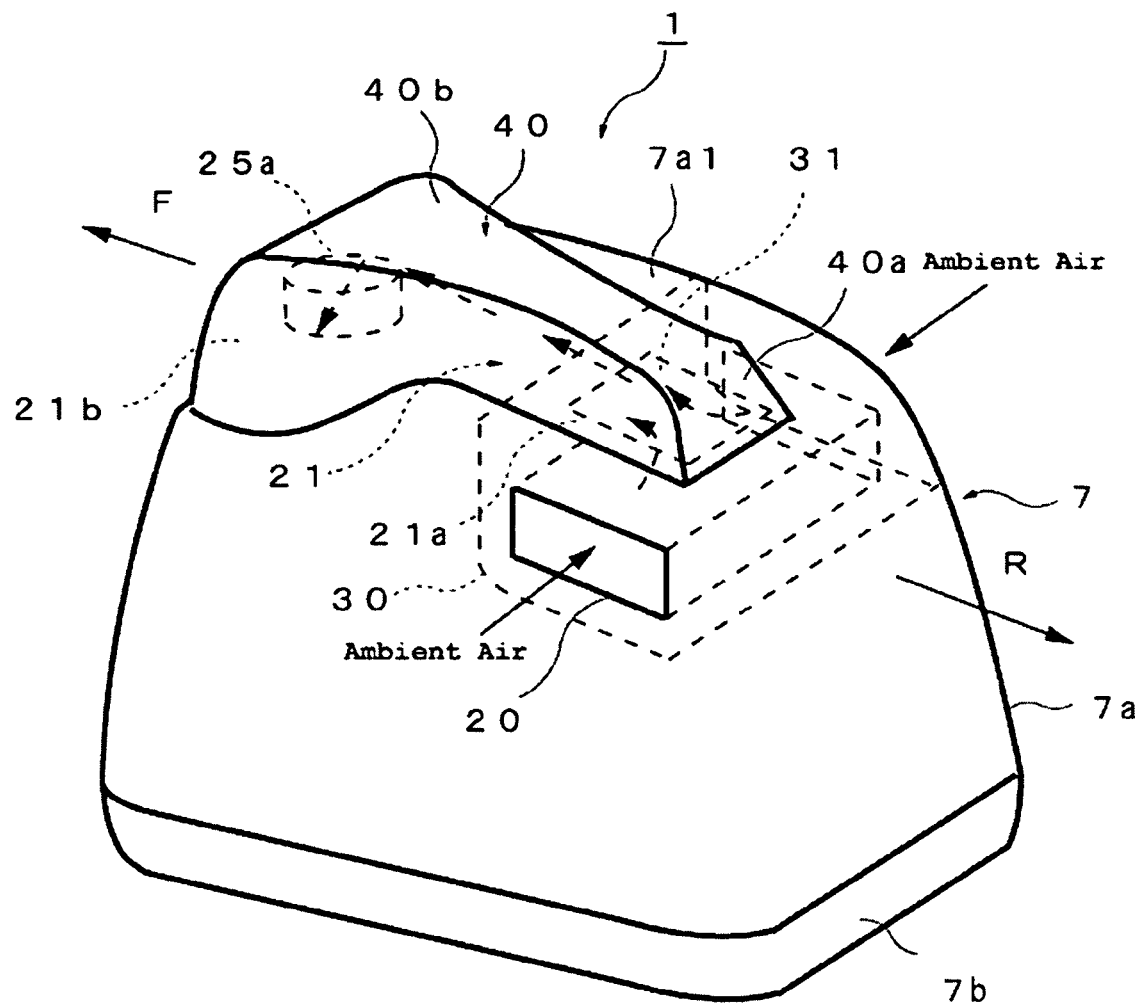
FIG. 2 is a perspective view of an embodiment of an outboard motor cowling, showing an ambient air intake arrangement.
Figure 3:
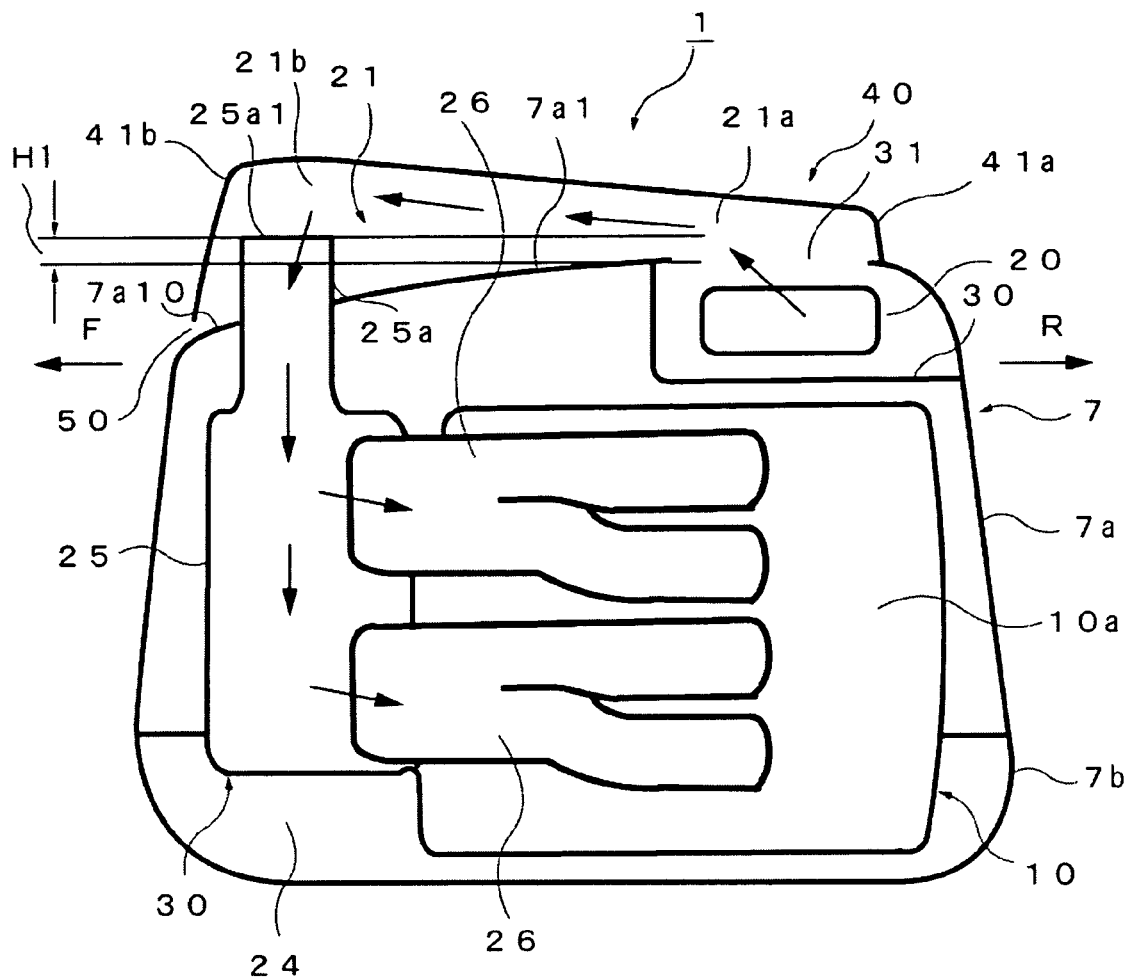
FIG. 3 is a cross sectional view of the cowling of FIG. 2.

With reference next to FIGS. 2 and 3, reference symbol F indicates a front side, i.e., watercraft side of the outboard motor (or forward direction), while reference symbol R indicates a rear side of the outboard motor, i.e., the side not facing the watercraft (or backward direction).

In the illustrated outboard motor 1, the cowling 7 encloses the engine 10, an ambient air intake 20 is defined by the cowling 7, and an intake passage 21 introduces ambient air that has been taken through the ambient air intake 20 to the engine 10.

The top cowling member 7a and the bottom cowling member 7b together form the cowling 7, which defines an engine compartment 24 therein. The engine 10 preferably is disposed within the engine compartment 24 in such a manner that cylinders 10a are positioned on a rear side and a silencer 25 is positioned on a front side. The silencer 25 is connected to intake conduits 26. The intake conduits 26 are connected to the respective cylinders 10a of the engine 10. In the illustrated embodiment, a top portion 25a of the silencer 25 passes through an upper surface of the top cowling member 7a to open in the interior of the intake passage 21.

With continued reference to FIGS. 2 and 3, a divider 30 preferably is combined with the top cowling member 7a at a location generally at or adjacent a rear portion of the top cowling member 7a. The ambient air intake 20 preferably is formed with openings that are defined on lateral sides of the rear portion of the top cowling member 7a in such a manner that the ambient air intake 20 extends transversely through the top cowling member 7a. A top section 7a1 of the top cowling member 7a has an inlet opening 31 that communicates with the intake passage 21. In the illustrated embodiment, the inlet opening 31 is positioned generally centrally in the ambient air intake 20. The top cowling member 7a is made of metal such as aluminum, or reinforced resin. The divider 30 preferably is also made of the same material. A circumferential edge of the divider 30 is attached to an inner surface of the top cowling member 7a and is affixed thereto by, for example, adhesive. The affixed portion preferably is sealed so that neither air nor water can enter the engine compartment 24 therethrough.

The intake passage 21 is defined by a cover member 40 which is separated from the top cowling member 7a and is combined with the top section 7a1 of the top cowling member 7a so as to extend out of the top cowling member 7a and above the top section 7a1 thereof. Similarly to the top cowling member 7a, the cover member 40 preferably is made of metal such as aluminum or reinforced resin and is affixed by, for example, adhesive. Also, the affixed portion preferably is sealed so that neither air nor water can enter the intake passage 21 therethrough.

The cover member 40 includes a rear section 40a covering the opening 31 and a front section 40b covering the top portion 25a of the silencer 25. In the illustrated embodiment, the cover member 40 gradually becomes broader in its transverse direction from the rear section 40a to the front section 40b, and also gradually becomes higher from the rear section 40a to the front section 40b. The intake passage 21, which is defined by the cover member 40 above and outside of the top cowling member 7a, has an inlet portion 21a communicating with the ambient air intake 20 through the opening 31 and an outlet portion 21b communicating with an air inlet 25a1 of the top portion 25a of the silencer 25 of the engine 10. The intake passage 21 gradually becomes broader in its transverse direction from the inlet portion 21a to the outlet portion 21b, and also gradually becomes higher from the inlet portion 21a to the outlet portion 21b. As thus discussed, because the intake passage 21 is defined by the cover member 40, which is separated from the cowling 7, little or no work of the cowling 7 is necessary for the intake passage 21. The cowling 7 thus can keep a very simple structure. In another embodiment, however, the intake passage 21 can be defined by a part of the cowling 7.

In the embodiment illustrated in FIGS. 2 and 3, ambient air is taken through the ambient air intake 20 by the operation of the engine 10 and is introduced into the intake passage 21 through the opening 31. The ambient air flows from the inlet portion 21a of the intake passage 21 to the outlet portion 21b thereof and is introduced into the air inlet 25a1 of the top portion 25a of the silencer 25.

During operation, a large wave may overtake the outboard motor 1 and can surmount the top cowling member 7a. A large volume of water thus can enter through the ambient air intake 20. This may occur, for example, if the outboard motor 1 mounted to the watercraft 100 is abruptly stopped and shifted to the reverse mode to move the watercraft 100 backward. Under this condition, a following wave approaches the outboard motor 1 and a large volume of water can enter through the ambient air intake 20. In addition, if the fishing method in which fish are caught while the watercraft 100 moves backward is applied, a large volume of water also can enter through the ambient air intake 20.

In instances in which a large volume of water may enter the ambient air intake 20, because the ambient air intake 20 is formed with openings that are defined at lateral sides of the top cowling member 7a and aligned with one another in such a manner that the ambient air intake 20 transversely and straightly extends through the top cowling member 7a, the water rushing into one of the openings can flow out through the other opening. Thus, this is one way water can be prevented from entering the intake passage 21.

Because the intake passage 21 extends out of the top cowling member 7a and thereabove, which forms the portion of the cowling 7, the intake passage 21 is positioned above the ambient air intake 20. Preferably, the intake passage 21 is placed sufficiently higher than the ambient air intake 20 so that even though a large volume of water may enter through the ambient air intake 20, little or none of that water enters the intake passage 21 through the opening 31 because the water's own weight discourages upward travel. Additionally, ambient air separated from the water enters the intake passage 21 through the opening 31. The air flows from the inlet portion 21a of the intake passage 21 to the outlet portion 21b thereof and can be introduced into the air inlet 25a1 of the top portion 25a of the silencer 25.

Also, the outlet portion 21b of the intake passage 21 is positioned above the inlet portion 21a thereof. More specifically, the air inlet 25a1 of the top portion 25a of the silencer 25 is a distance H1 vertically higher than the opening 31. Therefore, even if water were to enter the intake passage 21 through the opening 31, the water would not surmount the vertical offset H1 and would not enter the air inlet 25a1. In addition, because the cross-sectional area of the intake passage 21 at the outlet portion 21b is larger than the cross-sectional area of the intake passage 21 at the inlet portion 21a, the intake air velocity due to suction by the engine 10 decreases along the length of the intake passage 21, thus further facilitating separation of water from the air. With water that may enter the ambient air intake 20 separated from the intake air, such substantially dry intake air then flows through the air inlet 25a1 into a silencer 25 and further to the engine 10 for combustion.

Water that has been separated from air in the intake passage 21 accumulates at an outer top surface portion 7a10 of the top cowling member 7a. Preferably, a drain port 50 is defined between the top cowling member 7a and the cover member 40 at the portion 7a10 where the water accumulates. The water thus is drained to an external location of the top cowling member 7a through the drain port 50. With particular reference to FIG. 3, preferably the top section 7a1 of the top cowling member 7a generally slopes downwardly from a point at or adjacent the opening 31 to the location of the drain 50. As such, water that enters the intake passage 21, but falls onto the top section 7a1 will tend to flow toward the accumulation portion 7a10 and through the drain port 50. Because the intake passage 21 has the drain port 50 at a lower position on the side of the outlet portion 21b, even though the water entering through the ambient air intake 20 enters the intake passage 21 through the opening 31 and is led to the outlet portion 21b from the inlet portion 21a, the water is drained through the drain port 50, and does not remain in the interior of the intake passage 21 or enter the silencer 25.

Figure 4:
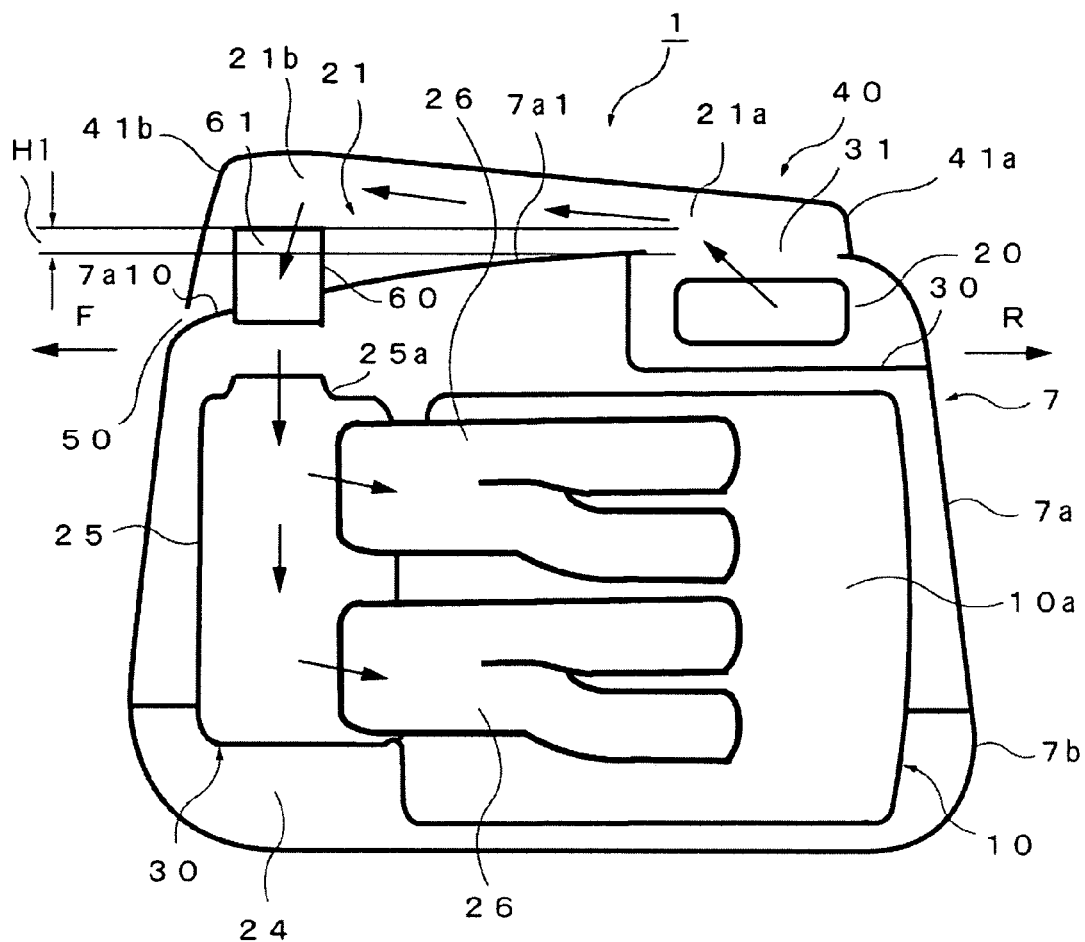
FIG. 4 is a cross sectional view of another embodiment of an outboard motor cowling.

With reference next to FIG. 4, another embodiment of an outboard motor is illustrated. Similarly to FIGS. 2 and 3, in FIG. 4, reference symbol F indicates the front side, i.e., watercraft side of the outboard motor (or forward direction), while reference symbol R indicates the rear side of the outboard motor, i.e., the side not facing the watercraft (or backward direction). In this embodiment, the same constituents as those of the embodiment shown in FIGS. 1 through 3 will be assigned with the same reference numerals or symbols, and their descriptions will not be repeated.

The outboard motor 1 in the illustrated embodiment has a communicating passage 61 defined by a cylindrical member 60 passing vertically through the top section 7a1 of the top cowling member 7a. The outlet portion 21b of the intake passage 21 communicates with the engine compartment 24 through the communicating passage 61. The top portion 25a of the silencer 25 does not pass through the top cowling member 7a. Instead, the cylindrical member 60 which preferably is separated from the silencer 25, extends through the top cowling member 7a. The structural shape of the silencer 25 thus can be very simple, and can be easily installed and/or serviced.

In the illustrated embodiment, ambient air is taken through the ambient air intake 20 by the operation of the engine 10 and is introduced into the intake passage 21 through the opening 31. The ambient air flows from the inlet portion 21a of the intake passage 21 to the outlet portion 21b thereof and is introduced into the engine compartment 24 through the communicating passage 61. The ambient air is then further introduced into an air inlet 25a1 of the silencer 25 within the engine compartment 24.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

1. An outboard motor comprising a cowling generally enclosing an engine, the engine having an air intake device and an intake conduit, the air intake device defining a chamber therewithin and having an air inlet adapted to induct air into the chamber and an outlet adapted to deliver air from the chamber to the intake conduit, the cowling comprising a top wall, opposing side walls, an ambient air intake having an inlet aperture defined through a wall of the cowling and an outlet aperture formed through the top wall of the cowling, and an intake passage adapted to communicate ambient air from the ambient air intake to the engine air intake device, the intake passage being disposed above the cowling top wall, wherein an inlet portion of the intake passage communicates with the ambient air intake outlet aperture, and an outlet portion of the intake passage communicates with the engine air intake device air inlet.

2. The outboard motor of claim 1, wherein the air inlet of the engine air intake device communicates with the intake passage outlet portion at a point above the cowling top wall.

3. The outboard motor of claim 2, wherein the engine air intake device comprises a silencer.

4. The outboard motor of claim 3, wherein a portion of the silencer extends through the cowling top wall.

5. The outboard motor of claim 1, wherein a cross-sectional area of the intake passage at or adjacent the outlet portion is greater than a cross-sectional area of the intake passage at or adjacent the inlet portion.

6. The outboard motor of claim 5, wherein a breadth of the intake passage at or adjacent the outlet portion is greater than a breadth of the intake passage at or adjacent the inlet portion.

7. The outboard motor of claim 5, wherein a vertical width of the intake passage at or adjacent the outlet portion is greater than a vertical width of the intake passage at or adjacent the inlet portion.

8. The outboard motor of claim 7, wherein the intake passage has a bottom surface, and the bottom surface generally slopes downwardly from the inlet portion toward the outlet portion.

9. The outboard motor of claim 1, wherein the intake passage is positioned above the ambient air intake.

10. The outboard motor of claim 9, wherein the outlet portion of the intake passage is disposed vertically higher than the inlet portion.

11. The outboard motor of claim 9, wherein the intake passage comprises a drain port, and the drain port is positioned on a side of the outlet portion generally opposite the inlet portion.

12. The outboard motor of claim 11, wherein the intake passage comprises a bottom surface, and the bottom surface slopes generally downwardly from the inlet portion toward the drain port.

13. The outboard motor of claim 12, wherein the intake passage is defined by a cover member attached to the cowling above the top wall, and the drain port is formed between the cover member and the cowling.

14. The outboard motor of claim 12, wherein the top wall of the cowling comprises the bottom surface of the intake passage.

15. The outboard motor of claim 9, wherein the ambient air intake comprises a pair of inlet apertures formed through opposing side walls of the cowling.

16. The outboard motor of claim 15, wherein the ambient air intake apertures are substantially aligned with one another transversely across the cowling.

17. The outboard motor of claim 1, wherein the intake passage comprises a cover member formed separately from the cowling and attached to an outer surface of the cowling.

18. The outboard motor of claim 16 additionally comprising a divider, wherein the ambient air intake is defined between the top wall of the cowling, the opposing side walls of the cowling, and the divider.

19. The outboard motor of claim 2, wherein the cowling encloses an engine compartment, and wherein air from within the intake passage is communicated through the engine air intake device to the intake conduit without mixing with air in the engine compartment.

* * * * *